United States Patent [19] [11] 3,947,358
Schreiber et al. [45] Mar. 30, 1976

[54] METHOD FOR BIOLOGICALLY TREATING SEWAGE AND AN INSTALLATION FOR CARRYING OUT THE METHOD

[75] Inventors: August Schreiber; Berthold Schreiber, both of Hannover-Vinnhorst, Germany

[73] Assignee: August Schreiber, Germany

[22] Filed: May 6, 1974

[21] Appl. No.: 467,669

[30] Foreign Application Priority Data
Mar. 15, 1974 Germany............................ 2412543

[52] U.S. Cl. ................................. 210/194; 210/220
[51] Int. Cl.² ........................................... C02C 1/12
[58] Field of Search ...................... 210/14, 15, 4–7, 210/17, 63, 194, 170, 319, 320, 220, 195, 221 M, 221 P

[56] References Cited
UNITED STATES PATENTS
3,336,016  8/1967  Schreiber ........................... 210/220
3,703,462  11/1972  Smith ................................... 210/17
3,733,263  5/1973  Mandt .................................. 210/14

FOREIGN PATENTS OR APPLICATIONS
1,658,129  4/1973  Germany ............................. 210/220

Primary Examiner—Charles N. Hart
Assistant Examiner—Benoit Castel
Attorney, Agent, or Firm—Watson, Cole, Grindle & Watson

[57] ABSTRACT

Apparatus for biologically treating sewage in an elongated circulation tank having a central partition extending along the longitudinal axis thereof thereby dividing the tank into two parallel flow channels connected together at opposite ends, aerators rotating about a perpendicular axis located along said longitudinal axis so that the sewage may be forced into a circulating flow about the perpendicular axis and about the partition. The circulating flow about said perpendicular axis thereby being decelerated and the sewage circulating about the partition being guided to and away from the rotating aerators with the full cross-section of the flow channels.

8 Claims, 4 Drawing Figures

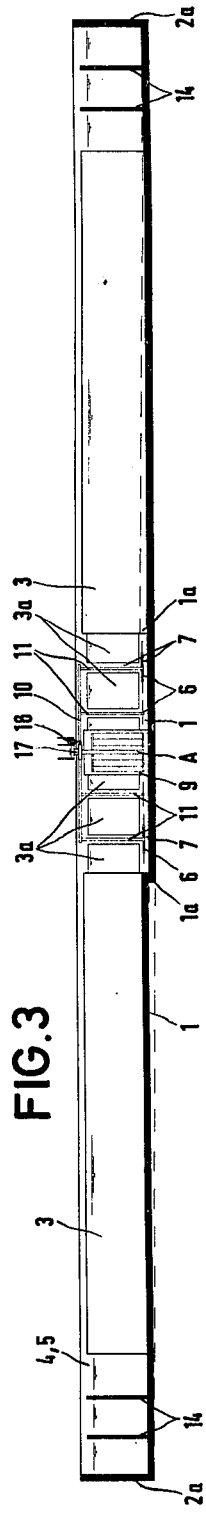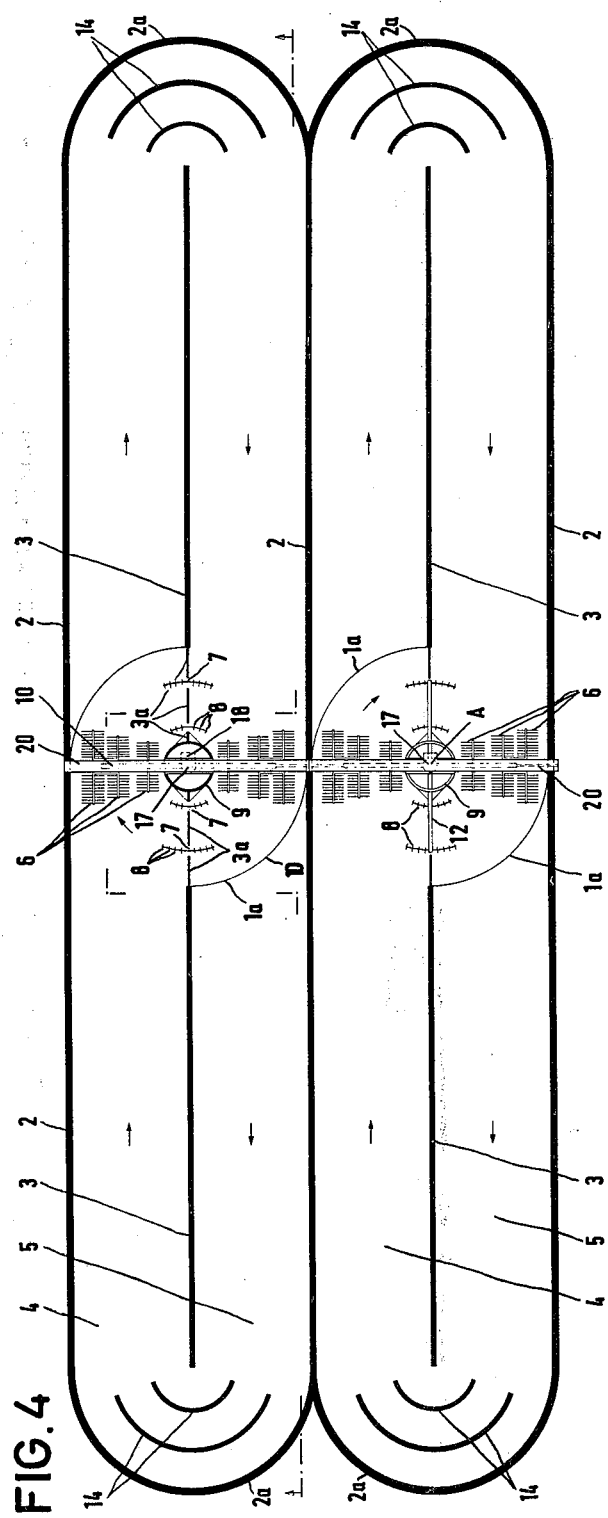

METHOD FOR BIOLOGICALLY TREATING SEWAGE AND AN INSTALLATION FOR CARRYING OUT THE METHOD

This invention relates an apparatus for biologically treating sewage with aeration of a flowing sewage/activated-sludge mixture in an elongated circulation tank which is divided by a longitudinally extending central partition terminating before and at a distance from the two end walls of the circulation tank, into two parallel flow channels connected together at the ends, and the sewage is forced by aerators rotating near the base of the tank about a perpendicular axis of rotation on the longitudinal axis of the circulation tank, into a circulating flow about the aforementioned axis of rotation and about the central partition, the circulating flow about the aforementioned axis of rotation being decelerated.

An apparatus of this kind is already known from German patent No. 1,658,129. In this known installation, the rotating aerators arranged in the vicinity of a rounded-off end wall of the circulation tank are each separated off from the two flow channels by means of a transverse partition, the transverse partitions being provided with throughflow openings to allow the sewage to be aerated to flow in and the aerated sewage to flow out.

The opening through which the sewage to be aerated flows in and the opening through which the aerated sewage flows out are arranged at different levels from the bottom of the tank in order to induce a substantially vertical flow which crosses and decelerates the flow of sewage, accompanying rotation of the aerators, about the axis of rotation of the aerators, so that the air bubbles issuing from the aerators ascend obliquely and, hence, have a longer residence time in the sewage to improve purification thereof. In addition, the central partition extends up to the axis of rotation of the rotating aerators and is provided with openings for the passage of the aerators in order to decelerate this flow.

The transverse partitions which are provided with the aforementioned throughflow openings and which considerably reduce the throughflow cross-section of the flow channels, represent throttle zones which keep the throughput through the vicinity of the rotating aerators at such a low level that the known installation is not suitable for the treatment of relatively large quantities of sewage.

The object of the invention is to provide an apparatus of the type referred to above with which relatively large quantities of sewage can be satisfactorily treated by maintaining as long as possible a residence time of the air bubbles issuing from the aerators, and, hence, by providing for effective oxygen utilisation.

According to the invention, this object is achieved in that the sewage circulating about the central partition is guided towards and away from the rotating aerators with its full cross-section present in the flow channels.

According to the invention, the aerators are rotated at a speed and, at the same time, air is blown from them into the sewage. By deceleration of the circulating flow of sewage caused by the rotation of the aerators, the air bubbles issuing from the aerators are deflected from the perpendicular so that they have to travel a long distance in the sewage, with the result that the required, long residence time of the air bubbles in the sewage is maintained. In this connection, it has been found that the delivery and diversion of the sewage in relation to the rotating aerators with its full cross-section present in the two flow channels, i.e. without throttling, is entirely sufficient for assuring the aforementioned aeration of the sewage and, in addition, by virtue of the unthrottled and, hence, increased throughput through the vicinity of the aerators, for producing such a favorable circulation around the central partition that the activated sludge required for effective sewage treatment is formed in the flow channels of the circulation tank. The effectiveness obtained in this way provides for the effective treatment of even relatively large quantities of sewage of the kind accumulating, for example, from 20,000 to several 100,000 inhabitants.

The aforementioned throughput can be further increased by additionally accelerating the sewage to intensify the circulating flow.

An optimum effect is obtained when the rotating aerators circulate at a speed of more than 40 cm per second.

An or apparatus according to the invention includes an elongated circulating tank which is divided by a longitudinally extending central partition terminating before and at a distance from the two end walls of the circulation tank. Thus provided are two parallel flow channels connected together at the ends, aerators rotating near the base of the tank about a perpendicular axis of rotation being located on the longitudinal axis of the circulating tank, and the central partition extending up to the axis of rotation of the rotating aerators and being provided with openings for the passage of the aerators in order to decelerate the sewage circulating around the rotating aerators. This installation is distinguished by the fact that the flow channels merge with their full cross-section into the vicinity of the rotating aerators.

The circulating flow is intensified by baffle surfaces circulating in the sewage about the axis of rotation of the aerators, the openings in that part of the central partition extending to the axis of rotation of the rotating aerators being dimensioned in such a way as to allow the baffle surfaces through as well. Although the baffle surfaces, which are best arranged transversely of their circular path of movement, reduce throughflow when they pass through the openings in the central partition, they generate a high water resistance after passing through the openings, thereby intensifying the circulation flow which has already been produced by the resistance of the aerators.

The apparatus or installation preferably comprises a bearing support which contains the axis of rotation of the revolving aerators and on which are rotatably mounted horizontal air distributor arms provided with a rotary drive from which air delivery pipes extend downwardly and at which ends the revolving aerators are connected. The bearing support comprises a vertical riser to which the rotatable air distributor arms are connected through seals. The baffle surfaces can also be rotatably mounted on the bearing support. To this end, the baffle surfaces can be arranged on the air delivery pipes and/or on separate, horizontal arms, mounted for rotation on the bearing support, of downwardly extending rods.

In another embodiment, the bottom of the flow channels has a gradient in front of the revolving aerators, looking in the direction of flow of the sewage circulating about the central partition, in order to avoid the deposition of sludge in this zone and further to promote circulation.

In addition to being arranged near one of the two ends of the circulation tank, the aerators can also be arranged at both ends of the circulation tank or in the middle of the longitudinal axis of the central partition.

In order to further promote flow, the end walls of the circulation tank can have an outwardly curved, semicircular outline or profile.

In order to ensure the supply of air required for biological sewage treatment, especially for relatively long circulation tanks, fixed base aerators are additionally arranged in the two flow channels at intervals from the revolving aerators.

In this case, the installation operates as follows: the aerators and the baffle surfaces within the semicircular end-wall profile of the circulation tank are driven, for example by an electric motor, at such a high speed that, during rotation of the aerators and baffle surfaces, the activated-sludge/water mixture is entrained from one side through the openings to the other side of the central partition, aerated and circulated about the central partition and, in addition, the necessary oxygen supplied through the base aerators. Through the rotation of the revolving aerators in the semicircular end-wall section, ascending air bubbles are distributed by these aerators over a large, moving surface, and cannot integrate with the rapidly ascending water/air mixture flows or ascend at high speed. On the contrary, the air bubbles only ascend slowly in this section of the end wall and also cause the activated-sludge/water mixture to circulate on account of the rotating movement of the aerators and baffle surfaces.

The pipe through which the sewage to be treated is introduced and the pipe through which the sewage enriched with activated-sludge is discharged each open into the circulation tank in the direction of flow of the sewage circulating about the central partition. After aeration and residence time, the effluent enriched with the necessary, developed activated-sludge, passes to a final settling tank where the necessary quantity of activated sludge is retained and the excess is eliminated in any manner.

Embodiments of the invention are illustrated by way of example in the accompanying drawings, wherein:

FIG. 3 is a longitudinal section through a modification of the embodiment illustrated in FIG. 1.

FIG. 4 is a plan view of the embodiment illustrated in FIG. 3.

Figure 1:
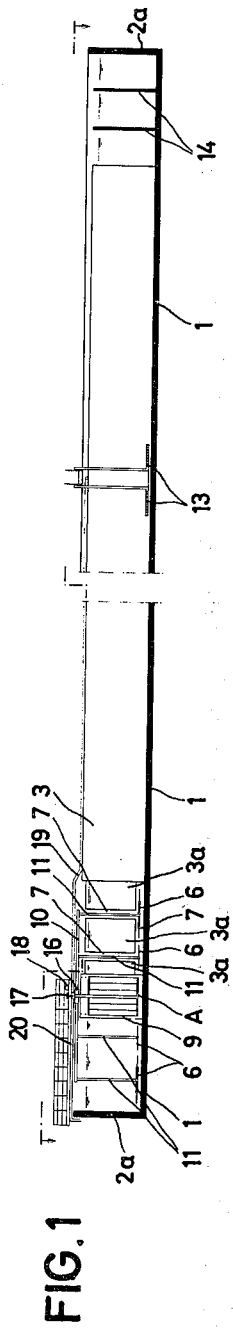
FIG. 1 is a longitudinal section through a circulation tank operated by the activated-sludge process.

The base of the recirculation tank is denoted by the reference 1 and the retaining wall by reference numeral 2. The elongated circulation tank is divided into two parallel flow channels 4,5 by a longitudinally extending central partition 3 terminating in front of and at a distance from the two end walls 2a of the circulation tank. By virtue of the fact that the central partition 3 terminates before the end walls 2a, the two flow channels 4 and 5 are connected together at the ends.

In the circulation tank, aerators 6 revolving in the vicinity of the base 1 about a perpendicular axis of rotation A situated on the longitudinal axis of the circulation tank induce a circulating flow about the axis of rotation A and about the central partition 3.

In order to decelerate the sewage circulating around the revolving aerators 6, the central partition 3 is continued up to the axis of rotation A of the revolving aerators 6. This extended part of the central partition 3 is denoted by the reference 3a in the drawing. The extension 3a is provided with openings 7 for the passage of the revolving aerators 6.

The sewage circulating about the central partition 3 is guided towards and diverted by the revolving aerator 6 with its full cross-section present in the flow channels 4 and 5. To this end, the flow channels 4 and 5 merge with their full cross-section into the vicinity of the revolving aerators 6, as shown in particular in FIGS. 2 and 4. The revolving aerators 6 are circulated about the axis of rotation A at a speed of more than 40 cm per second.

In order to intensify the circulating flow, baffle surfaces 8 circulating in the sewage about the axis of rotation A of the aerators 6 are provided, extending substantially transversely of their circular path of movement. The openings 7 in the extension 3a of the central partition 3 continued up to the axis of rotation A of the revolving aerators 6 are dimensioned for the passage of the baffle surfaces 8 as well.

The axis of rotation A of the revolving aerators 6 is contained in a bearing support 9 on which horizontal air distributor arms 10 provided with a rotary drive are mounted for rotation. Air delivery pipes 11 extend downwardly from the air distributor arms 10, the revolving aerators 6 being connected to their ends. The air delivery pipes 11 pass through the openings 7 together with the aerators 6.

The baffle surfaces 8 are arranged on rods extending downwardly from separate horizontal arms 12 mounted for rotation on the bearing support 9 and/or on the air delivery pipes 11. In order to facilitate passage through the openings 7, these rods are at the same distance from the axis of rotation A as the air delivery pipes 11.

As shown in FIG. 3, the base 1 of the flow channels 4 and 5 is provided with a gradient in front of the revolving aerators 6, as seen in the direction of flow. In FIGS. 3 and 4, the base 1 of the flow channel 5 extends with a gradient from the end wall 2a of the circulation tank to the vicinity of the revolving aerators 6 where the base 1 reaches a higher level through a threshold 1a. The base of the flow channel 5 then extends, again with a gradient, from the threshold 1a up to the left-hand end wall 2a of the circulation tank. The flow channel 4 then extends with a gradient from the left-hand end wall 2a of the circulation tank to the vicinity of the revolving aerators 6, more particularly up to the threshold 1a provided in the flow channel 4. At this point, there is again a jump to a higher level, after which the base 1 of the flow channel 4 extends from the threshold 1a to the right-hand end wall 2a of the circulation tank, again with a gradient.

Figure 2:
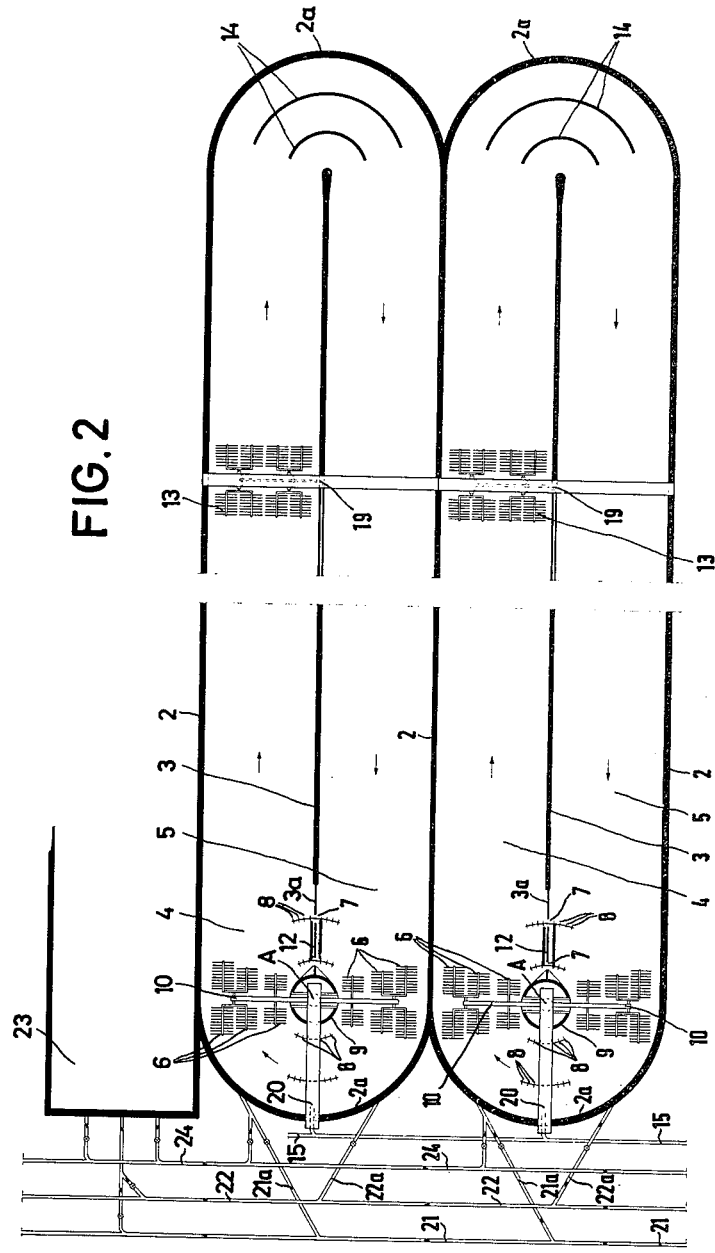
FIG. 2 is a plan view of two adjacent circulation tanks with an associated final settling tank.

In the embodiments illustrated in FIGS. 1 and 2, the revolving aerators 6 are provided in the vicinity of the left-hand end wall 2a of the circulation tank. In the case of particularly long circulation tanks, the revolving aerators 6 can also be arranged in the vicinity of the two end walls 2a of the circulation tank. In this case, the revolving aerators 6 rotate in the same direction. In the embodiment illustrated in FIGS. 3 and 4, the revolving aerators are arranged substantially near the middle of the central partition 3. The end walls 2a of the circulation tank each have an outwardly curved, semicircular profile.

In the embodiment illustrated in FIGS. 1 and 2, fixed based aerators 13 are provided in addition to the revolving aerators 6.

In the vicinity of the end walls 2a of the circulation tank which are not provided with revolving aerators, curved diverting walls 14 for the circulating sewage are provided at an interval from the end wall 2a and spaced intervals from one another.

The compressed airline which is used for feeding the aerators and which comes from a compressed air source is denoted by reference numeral 15. It leads to the axis of rotation A and from there, through a suitable airtight swivel coupling 16, into the horizontal air distributor arms 10 by way of a riser 17 mounted on the bearing support 9. An electric motor 18 is also provided on the bearing support 9, acting as a rotary drive for the horizontal air distributor arms 10 and for the horizontal arms 12 of the baffle surfaces 8.

The compressed airline 15 also has a branch 19 for supplying the fixed base aerators 13.

Finally, a servicing bridge 20 which can be fixedly arranged is provided in the vicinity of the revolving aerators 6. The revolving aerators 6 arranged in groups and the baffle surfaces 8, for example in the form of baffle plates, can be removed, cleaned and, if necessary, replaced from the servicing bridge 20.

As shown in FIG. 2, in which two circulation tanks are arranged parallel to and adjacent one another, the untreated sewage to be purified is introduced through a pipe 21 from which branch pipes 21a open into the particular circulation tank in the direction of flow of the circulating sewage. The same applies as regards the branch pipes 22a for the treated sewage which lead to a collecting pipe 22 through which the activated-sludge/water mixture coming from the circulation tank is passed into a final settling tank 23 arranged adjacent the two circulation tanks. The pipe for the biologically purified water which leads off from the final settling tank 23 to a recipient is denoted by the reference 24.

It is possible in this way, using relatively simple means, to manufacture and operate at very little cost activated-sludge installations for purifying even relatively large quantities of sewage.

We claim:

1. An apparatus for biologically treating sewage comprising:
    an elongated circulation tank;
    a longitudinally extending central partition extending upwardly of the bottom wall of said tank, said partition terminating adjacent to and at a distance from opposite end walls of said tank, thereby defining two parallel flow channels connected together at opposite ends, said tank end walls having an outwardly curved, approximately semicircular profile;
    an aerator mounted on a bearing support for rotation about an axis perpendicular to said bottom wall and located on the longitudinal axis of said tank, said aerator having aeration means near its base for aerating the sewage as said aerator rotates;
    sewage inlet and outlet means on said tank respectively open in direction of sewage flow within said tank;
    said partition extending toward and adjacent to said perpendicular axis, for decelerating the sewage circulating about said aerator and said partition having openings for the passage of said aeration means and of air supply conduits associated therewith;
    said flow channels merging into the vicinity of said aerator in full cross-section present in the portion of the flow channels out of the vicinity of said aerator; and,
    baffles mounted on said bearing support for rotation about said perpendicular axis, said partition openings also permitting the passage of said baffles.

2. The apparatus according to claim 1, wherein said bearing support contains said perpendicular axis, horizontal air distributor arms extending outwardly of said support, rotary drives for rotating said arms about said perpendicular axis, air delivery conduits extending downwardly of said arms, and said aerator being mounted at the free ends of said delivery conduits, said baffles also being rotatably mounted on said bearing support.

3. The apparatus according to claim 2, wherein said baffles are located on said air delivery pipes.

4. The apparatus according to claim 2, further comprising other horizontal arms extending outwardly of said bearing support, rods on said other arms extending downwardly thereof, said baffles being located on said rods, and said baffles being at the same distance from said perpendicular axis as said air delivery conduits.

5. The apparatus according to claim 1, wherein said bottom wall of said tank has a gradient in the vicinity of said aerator.

6. The apparatus according to claim 1, wherein said aerator is located near one of said tank end walls.

7. The apparatus according to claim 1, wherein said aerator is located substantially at the center of said partition between its ends.

8. The apparatus according to claim 1, wherein other aerators are fixedly mounted within said tank.

* * * * *